(12) United States Patent
Kargilis et al.

(10) Patent No.: US 6,491,147 B1
(45) Date of Patent: Dec. 10, 2002

(54) METHOD FOR ATTACHING A CLUTCH PEDAL ASSEMBLY TO A VEHICLE FOR ADAPTATION FROM AN AUTOMATIC TRANSMISSION TO A MANUAL TRANSMISSION APPLICATION

(75) Inventors: John S Kargilis, Northville, MI (US); Richard Carter, Shelby Township, MI (US); Syed T Razzacki, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 28 days.

(21) Appl. No.: 09/703,969

(22) Filed: Nov. 1, 2000

(51) Int. Cl.$^7$ .............................................. B60K 41/24
(52) U.S. Cl. .................................... 192/13 R; 192/99 S
(58) Field of Search ............................ 192/13 R, 99 S; 74/512, 513

(56) References Cited

U.S. PATENT DOCUMENTS

| | | | | |
|---|---|---|---|---|
| 1,469,258 A | * | 10/1923 | Geister | 74/512 |
| 1,478,407 A | * | 12/1923 | Strut | 180/315 |
| 3,563,111 A | * | 2/1971 | Zeigler | 74/512 |
| 4,060,144 A | * | 11/1977 | Teti | 180/317 |
| 6,155,393 A | * | 12/2000 | Goto | 192/13 R |

* cited by examiner

Primary Examiner—Saúl Rodríguez
(74) Attorney, Agent, or Firm—Mark P. Calcaterra

(57) ABSTRACT

A method for attaching a clutch pedal assembly to a vehicle with a brake pedal assembly for a manual transmission conversion from an automatic transmission application including extension of a brake support shaft laterally from an existing brake pedal assembly and through a clutch pedal supporting bushing and then further outward into engagement with a wall of the vehicle. Specifically, the outward end of the support shaft is insertably extended through a hole in the wall of the vehicle for supporting that end portion of the shaft. The method further includes utilizing a metal cutting edge or tip on the outward end of the support shaft such that rotation of the support shaft can drill the support hole in the vehicle wall.

4 Claims, 3 Drawing Sheets

METHOD FOR ATTACHING A CLUTCH PEDAL ASSEMBLY TO A VEHICLE FOR ADAPTATION FROM AN AUTOMATIC TRANSMISSION TO A MANUAL TRANSMISSION APPLICATION

BACKGROUND OF THE INVENTION

1. Field of the Invention

The present invention relates generally to a clutch pedal assembly and, more particularly, to a method for attaching a clutch pedal assembly to a vehicle.

2. Description of the Related Art

Generally, a clutch and clutch pedal assembly is only necessary in a vehicle with a manually shifted transmission, while no clutch and clutch pedal assembly is necessary in a vehicle with an automatic transmission. In changing gears of a manual transmission, the driver deactivates the clutch by depressing the clutch pedal assembly which is operatively attached to the clutch. Typically, the clutch pedal assembly is located in the passenger compartment on the cowl panel on the driver's side just above the floor panel and adjacent to the brake pedal assembly.

In a vehicle having an automatic transmission, it is sometimes desired to add a clutch and, thereby, a clutch pedal assembly to thereby convert the vehicle into a manually shifting application using a manual transmission. There are methods known for attaching a clutch pedal assembly to a vehicle to make this conversion. In particular, it is known to use an existing brake pedal assembly for both the automatic and manual transmission applications by adding a clutch pedal assembly to the brake pedal assembly when converting from an automatic transmission application to a manual transmission application.

However, the known methods in the related art for attaching a clutch pedal assembly to a brake pedal assembly are typically complex and require unique support bracketry. Furthermore, such methods require multiple parts and, therefore, involve much cost, labor, complexity, weight, development and design time. The packaging of a clutch pedal assembly using these known methods is also complex. As such, the known methods for attaching a clutch pedal assembly to a brake pedal assembly are operationally inefficient and costly to perform.

Accordingly, there remains a need in the art for a method for simply attaching a clutch pedal assembly to a vehicle for conversion from an automatic transmission application to a manual transmission application.

SUMMARY OF THE INVENTION

The present invention overcomes the disadvantages in the related art pertaining to a method and apparatus for putting together a clutch pedal assembly with a brake pedal assembly for conversion from an automatic transmission application to a manual transmission application. The brake pedal assembly includes a mounting bracket adapted to be attached to the front of the vehicle's cowl panel within the passenger compartment. Specifically, a support shaft for the brake pedal extends between opposed sides of the mounting bracket. The method of adding a clutch pedal assembly includes extending the brake pedal support shaft and mounting a clutch pedal upon the support shaft such that the support shaft eventually supports both brake and clutch pedals.

The method further includes the operation of axially extending the support shaft in its longitudinal axial direction laterally outward with respect to the vehicle so that the shaft's outward end engages a side extending wall of the cowl panel. Simultaneously with the aforesaid outward axial movement, the shaft is also rotated. The end of the shaft which engages the side cowl wall is configured as a drill-bit so that it bores a hole through the side cowl panel. This action results in the shaft end extending through the side cowl panel which provides support for the outer end of the shaft.

The attachment method of the present invention for the clutch pedal assembly simplifies the addition of a clutch pedal assembly to a brake pedal assembly when a conversion from an automatic transmission application to a manual transmission application is desired. The method could also be applied to original assembly of the vehicle where a quantity of manual transmission applications are necessary. Since the brake pedal assembly provides support to one end of the shaft and the side cowl panel provides support for the opposite end of the shaft, this method and apparatus does not require a separate mounting bracket for the clutch pedal assembly.

As a result, one advantageous feature of the clutch pedal assembly attachment method of the present invention is simplification of the process of converting from an automatic transmission application to a manual transmission application.

Finally, these advantages are achieved in a clutch pedal assembly that is operationally efficient and cost-effective relative to the complex methods and assemblies proposed in the related art.

BRIEF DESCRIPTION OF THE DRAWINGS

Other advantages of the invention will be readily appreciated as the same becomes better understood by reference to the following detailed description when considered in connection with the accompanying drawings, wherein.

DESCRIPTION OF THE PREFERRED EMBODIMENT(S)

Figure 1:
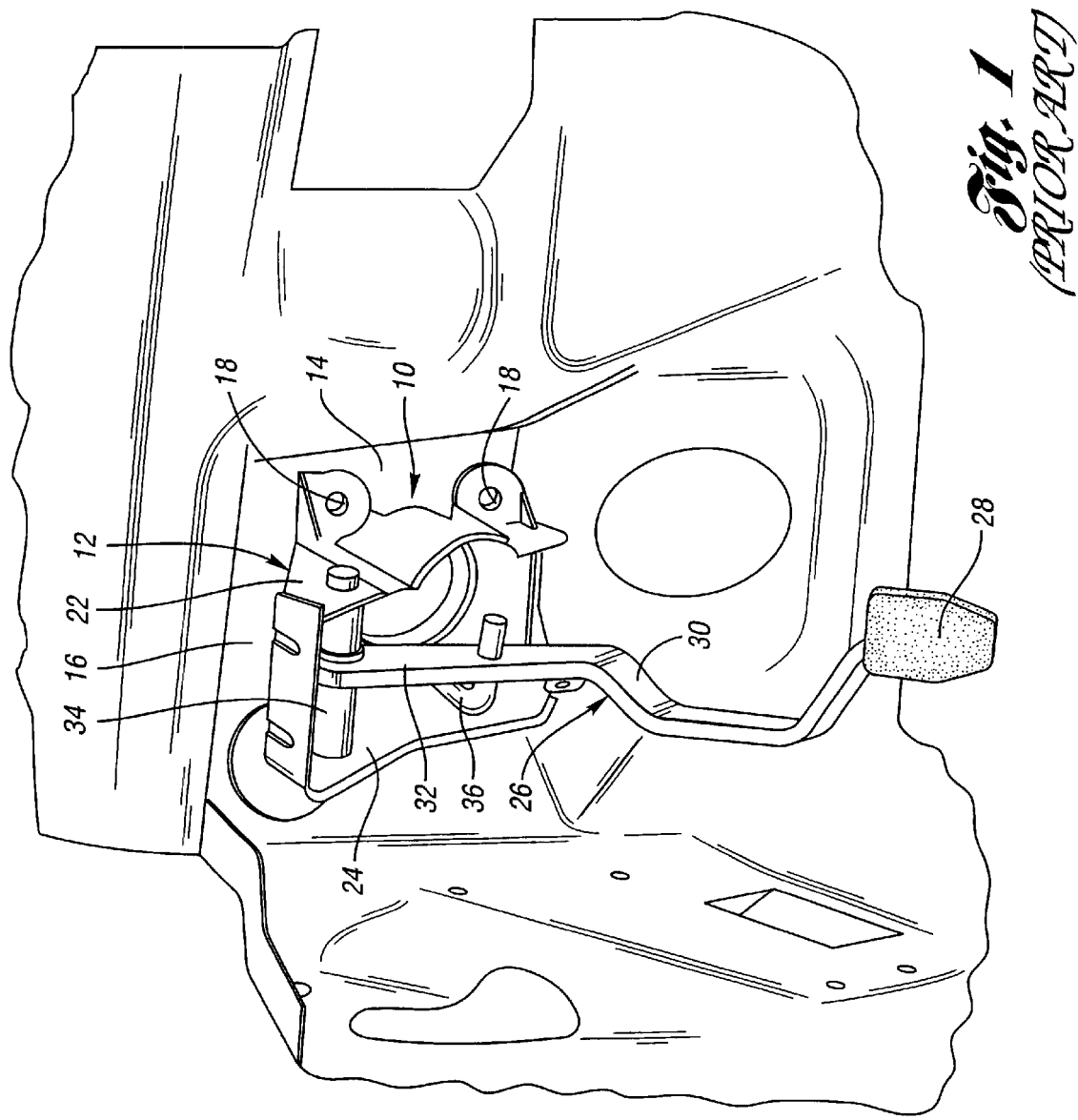
FIG. 1 is a perspective view of a prior art brake pedal assembly of a vehicle for an automatic transmission application.

Referring to FIG. 1, a prior art brake pedal assembly for a vehicle with an automatic transmission is indicated at 10. Such automatic transmission application does not require a clutch or clutch pedal assembly. The brake pedal assembly 10 includes a mounting bracket 12 adapted to be attached to the inside front wall 14 of a cowl panel 16 of the vehicle. Typically, the bracket 12 is attached to the wall 14 by a fasteners extending through openings 18 in the bracket 12 as is commonly known to those of ordinary skill in the related art. The assembly 10 includes a support shaft 20 which extends between a first side portion 22 and a second side portion 24 of the mounting bracket 12. The support shaft 20 is fixed to the mounting bracket 12 at the ends thereof by a manner commonly known to those of ordinary skill in the related art. A brake pedal, generally indicated at 26, includes a pedal portion 28 and an arm 30 extending from the pedal 28 to an upper end portion 32. A support bushing 34 is attached to the upper end portion 32 of the pedal arm 30 for movement together. The support bushing 34 has an axially extending bore through which the support shaft 20 extends. Accordingly, the arm 30 is supported such that the brake pedal assembly 26 is allowed to pivot about the support shaft 20. When the pedal assembly is pivoted for a brake application, the movement of the arm 30 causes an attached brake rod 36 to be moved toward the wall 14.

Figure 2:
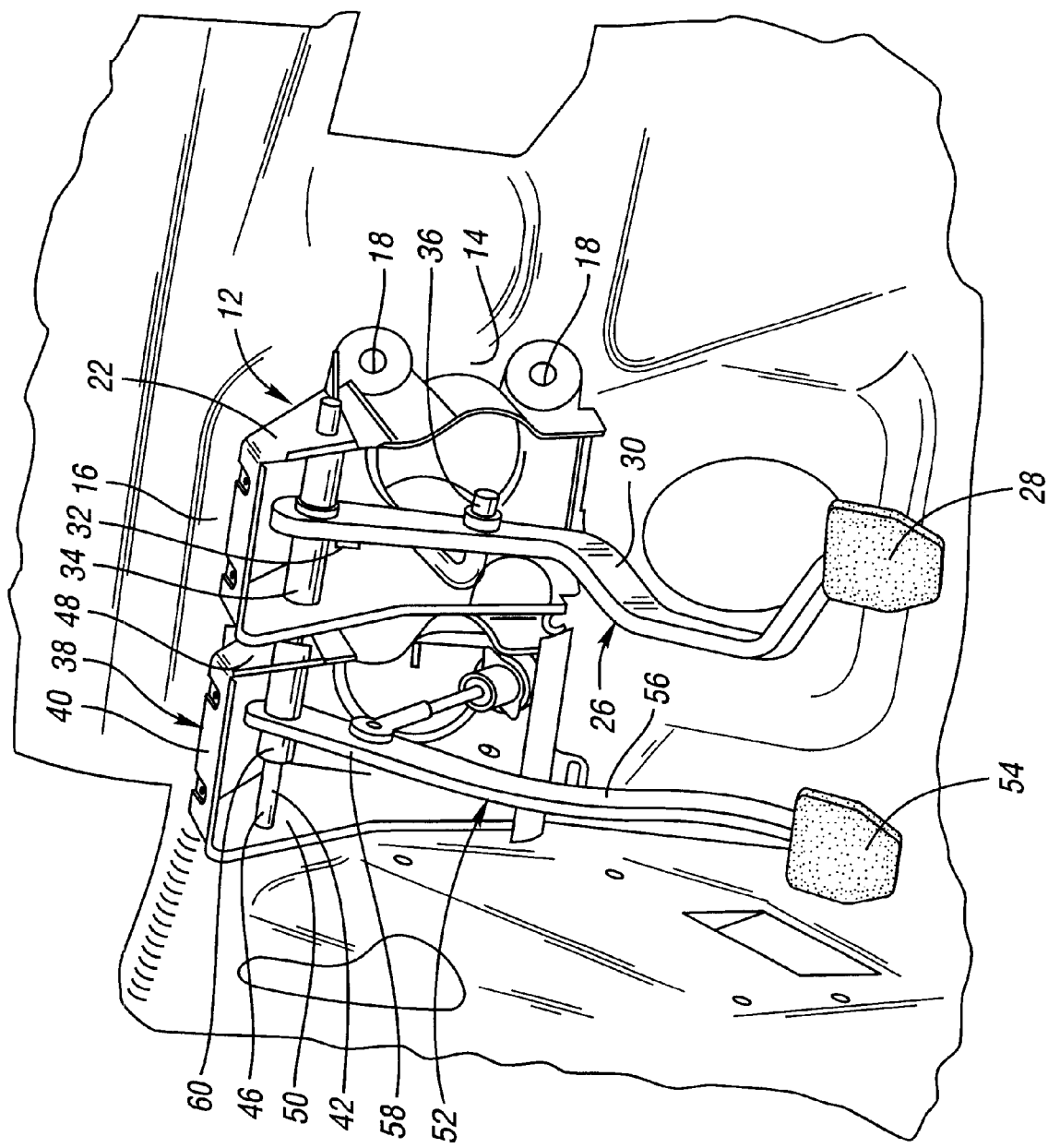
FIG. 2 is a perspective view of a prior art clutch pedal and a brake pedal assembly attached to a vehicle for a manual transmission application.

Referring to FIG. 2, a prior clutch pedal assembly is shown generally at 38 attached adjacent to the brake pedal assembly 12 of FIG. 1 by a manner known in the art. The clutch pedal assembly 38 includes a mounting bracket 40 adapted to be attached to the inside front 14 of the cowl panel 16 of the vehicle by a manner commonly known to those of ordinary skill in the related art. Again, a support shaft 42 having a first end 44 and a second end 46 is affixed to the mounting bracket 38 between first and second side portions 48, 50 thereof. A clutch pedal, generally indicated at 52, includes a pedal 54 and an arm 56 extending from the pedal 54 to an upper end portion 58. A clutch pedal support bushing 60 supports the upper end 58 of the arm 56 on the support shaft 42 such that the clutch pedal assembly 52 is pivotable about the support shaft 42.

Figure 3:
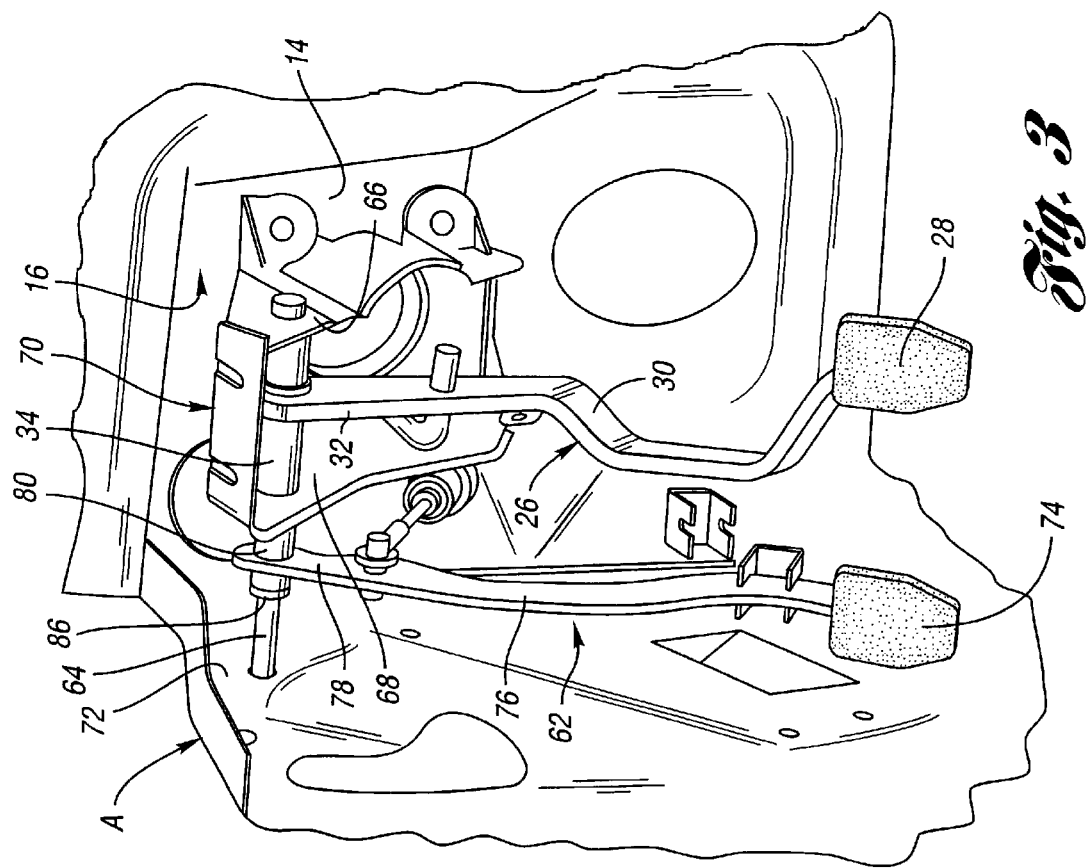
FIG. 3 is a perspective view of a clutch pedal assembly supported on a vehicle according to the present invention.

Referring to FIG. 3, a clutch pedal assembly according to the present invention, generally indicated at 62 is shown secured adjacent to the brake pedal assembly 10 as seen in FIGS. 1 and 2. The clutch pedal assembly 62 includes a support shaft 64 extending longitudinally between a first end portion 66 and opposite second end portion 68 of a bracket 70. In the preferred embodiment, the support shaft 64 for both the brake pedal assembly 10 and the clutch pedal assembly 62 is a single, integral shaft that extends outwardly from the first side portion 66 of the brake pedal mounting bracket 12 and towards side wall 72 of the vehicle's cowl panel.

The clutch pedal assembly 62, includes a pedal 74 and an arm 76 extending from the pedal 74 to an upper end 78. The upper end 78 is attached to support bushing 80 which has an axially extending bore through which the support shaft 64 extends. Accordingly, the support bushing 80 supports the arm 76 on the shaft 64 such that the clutch pedal assembly 62 is pivotable about the support shaft 64. As shown in FIG. 3, the outer end portion 82 of the support shaft 64 extends through an opening in wall 72 for supporting that end of the shaft.

Figure 4:
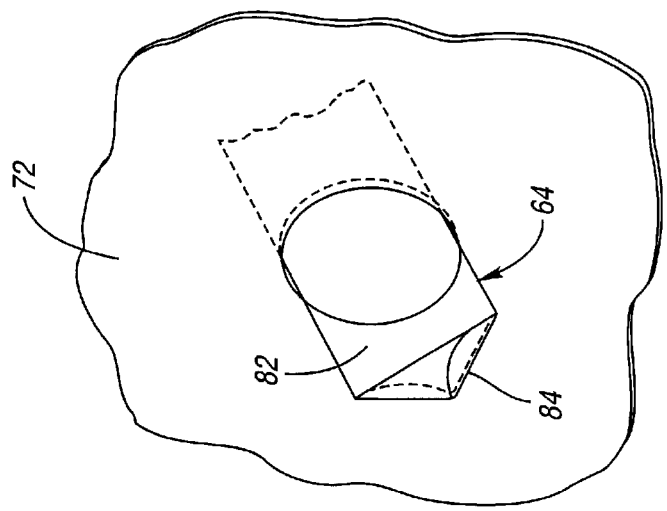
FIG. 4 is a enlarged perspective view of the end of the clutch support shaft and the side support wall of the vehicle.

Looking now to FIG. 4, the support shaft 62 includes a metal cutting edge or tip 84 located at the extreme end of the end portion 82 of the support shaft 64. The cutting tip 84 is sued to install the combination brake pedal assembly 10 and clutch pedal assembly 62 by the following assembly operations: the brake pedal mounting bracket 70 is attached to the inside front wall 14 of the cowl panel 16; the end portion 82 of the support shaft 64 is inserted through an aperture in the side 66 of the brake pedal mounting bracket 70 and inserted through the brake pedal bushing 34 and then through a second aperture in the side 68 of the mounting bracket 70; then the shaft 64 is inserted through the bushing 80 of the clutch pedal assembly 62 and moved toward the wall 72. Subsequently, the outward end portion 82 of the support shaft 64 is inserted through the wall 72 to support that end of the shaft 64. The end portion 82 carries the metal cutting tip 84 in order to drill a hole in the wall 72 as the shaft is both moved to the left in FIG. 3 and rotated. As shown in FIG. 3, the end portion 82 of the support shaft 64 extends through and is thus supported by the edge of the hole in wall 72. It is desirable to utilize a retaining collar or clip 86 on the end of the support shaft 64 to secure the support bushing 80 in a desired position on the support shaft 64. Accordingly, the invention utilizes the existing brake pedal mounting bracket along with the cowl panel 16 to support the shaft carrying the clutch pedal assembly 62.

In this way, the clutch pedal assembly attachment method of the present invention simplifies the addition of a clutch pedal assembly to a brake pedal assembly of a vehicle for a manual transmission application. This attachment method does not require a separate mounting bracket for supporting the clutch pedal as the side wall of the cowl panel and the brake pedal assembly provide the support necessary to add the clutch pedal support shaft and clutch pedal.

As a result, the clutch pedal assembly attachment method of the present invention simplifies manual transmission application. Also, the method eliminates unique support bracketry commonly associated with attachment of a clutch pedal assembly to a brake pedal assembly of a vehicle for a manual-transmission application. In addition, the method reduces parts and the attendant cost, labor, complexity, weight, development and design time, fasteners, and investment associated with attachment of a clutch pedal assembly to a brake pedal assembly of a vehicle for a manual transmission application. Furthermore, the method simplifies the packaging of a clutch pedal assembly. Finally, these advantages are achieved in a clutch pedal assembly attachment method that is operationally efficient and cost-effective to perform relative to the complex methods proposed in the related art.

What is claimed is:

1. A brake and clutch pedal assembly for use on a vehicle comprising:

a brake mounting bracket having first and second sidewalls adapted to be attached to a cowl panel of the vehicle, a support shaft extending through aligned holes in the first and second sidewalls of said brake mounting bracket, a brake pedal supported between said first and second sidewalls in a pivotable manner about said support shaft;

said support shaft having a first end extending from the brake mounting bracket to a wall portion of the cowl panel for support thereby and an opposite second end supported by said brake mounting bracket; and a clutch pedal assembly supported by and pivotable about said support shaft between said brake mounting bracket and said wall of the cowl panel.

2. The brake and clutch pedal assembly as set forth in claim 1, further comprising a clutch support bushing disposed about said support shaft between said mounting bracket and said wall of said cowl panel.

3. The brake and clutch pedal assembly as set forth in claim 2, further comprising a retainer disposed about said support shaft for restraining axial movement of said clutch bushing along said support shaft.

4. A brake and clutch assembly for use on a vehicle having a cowl panel with a first cowl panel wall and a second cowl panel wall extending at an angle to the first cowl panel wall, the assembly comprising:

a brake mounting bracket having first and second sidewalls adapted to be attached to the first cowl panel wall, a support shaft extending through aligned holes in the first and second sidewalls of the brake mounting bracket, a brake pedal supported between the first and second sidewalls in a pivotable manner about the support shaft;

the support shaft including a first end carrying a cutting tip adapted to engage and pierce the second cowl panel wall for supporting the first end and a second end supported by the brake mounting bracket; and a clutch pedal assembly supported by and pivotable about the support shaft between the brake mounting bracket and the second cowl panel wall.

* * * * *